(12) United States Patent
Poole et al.

(10) Patent No.: US 10,482,497 B2
(45) Date of Patent: Nov. 19, 2019

(54) SYSTEM AND METHOD FOR PROVIDING SMART STATEMENTS

(71) Applicant: Capital One Financial Corporation, McLean, VA (US)

(72) Inventors: Thomas S. Poole, Chantilly, VA (US); Luke A. Hammock, Washington, DC (US); Janusz Michael Niczyporuk, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 14/158,449

(22) Filed: Jan. 17, 2014

(65) Prior Publication Data

US 2014/0207572 A1    Jul. 24, 2014

Related U.S. Application Data

(60) Provisional application No. 61/754,006, filed on Jan. 18, 2013.

(51) Int. Cl.
*G06Q 30/00* (2012.01)
*G06Q 30/02* (2012.01)
*G06Q 40/02* (2012.01)

(52) U.S. Cl.
CPC ......... *G06Q 30/0255* (2013.01); *G06Q 40/02* (2013.01)

(58) Field of Classification Search
CPC .......................... G06Q 30/00–30/284

USPC .............................................. 705/14.1–14.73
See application file for complete search history.

(56) References Cited

U.S. PATENT DOCUMENTS

| | | | |
|---|---|---|---|
| 9,203,914 B1* | 12/2015 | Farago | H04L 67/18 |
| 2008/0086368 A1* | 4/2008 | Bauman | G06Q 30/02 705/7.34 |
| 2009/0030776 A1* | 1/2009 | Walker | B42D 15/00 705/7.34 |
| 2011/0231257 A1* | 9/2011 | Winters | G06Q 30/02 705/14.53 |

* cited by examiner

*Primary Examiner* — John Van Bramer
(74) *Attorney, Agent, or Firm* — Troutman Sanders LLP; Christopher J. Forstner; John A. Morrissett

(57) ABSTRACT

Systems and methods for providing purchase driven financial statements include an account processor that receives account data associated with one or more financial accounts of the account holder and advertising data via a network; one or more databases that stores at least the received account data and the received advertising data; and a statement processor that creates a financial statement based at least in part on the account data and the advertising data, provides the financial statement to an account holder, and tracks the account holder's future account data based on the provided advertising data.

16 Claims, 7 Drawing Sheets

SYSTEM AND METHOD FOR PROVIDING SMART STATEMENTS

CROSS-REFERENCE TO RELATED APPLICATIONS

This application claims priority to U.S. Provisional Patent Application No. 61/754,006, filed on Jan. 18, 2013, the entire contents of which is incorporated herein by reference.

FIELD OF THE DISCLOSURE

The present disclosure relates to systems and methods for providing purchase-data driven statements to an account holder at a financial institution.

BACKGROUND OF THE DISCLOSURE

Bank/credit card statements are dull, difficult to read and make use of, and generally only allow customers and account holders to view their purchasing activity and get an update on their account status. Information in traditional bank statements may not be presented in a way that is appealing to account holders.

Advertisers and merchants want to reach consumers who are relevant to them (i.e. make purchases at stores that sell their products, make purchases at stores that suggest a certain customer profile/segment) but have difficulty doing so. Targeted advertisements designed to reach consumers based on their past purchases, demographic information, etc., are generally more cost-effective for advertisers and merchants compared to traditional methods of blanket advertising. Furthermore, advertisers and merchants are increasingly seeking interactive forms of advertising that invite feedback and other responses from consumers.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

SUMMARY OF THE DISCLOSURE

The various example embodiments provide systems and methods for providing purchase-data driven financial statements. An example system may include an account processor that receives account data associated with one or more financial accounts of the account holder and advertising data via a network; one or more databases that stores at least the received account data and the received advertising data; and a statement processor that creates a financial statement based at least in part on the account data and the advertising data, provides the financial statement to an account holder, and tracks the account holder's future account data based on the provided advertising data.

An example method may include receiving account data associated with one or more financial accounts of the account holder via a network, receiving advertising data via a network, storing the account data in a database, storing the advertising data in a database, creating a financial statement based at least in part on the account data and the advertising data, providing the financial statement to the account holder, and tracking account holder's future account data based on the provided advertising data.

DETAILED DESCRIPTION OF THE EMBODIMENTS

The following description is intended to convey a thorough understanding of the embodiments described by providing a number of specific example embodiments and details involving systems and methods for providing purchase-data driven statements—hereinafter also referred to as "smart statements"—to an account holder. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

Figure 1:
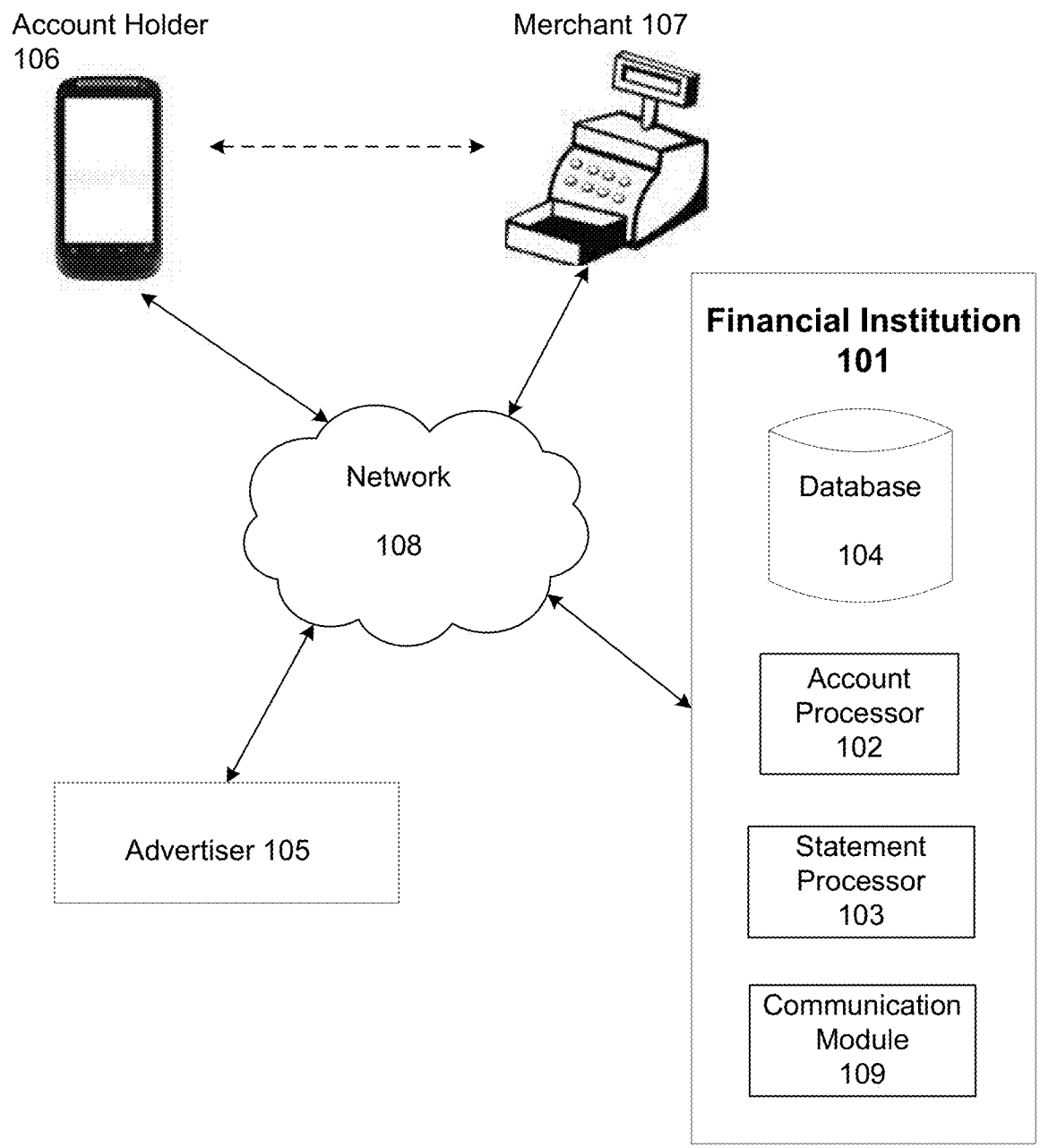
FIG. 1 depicts a schematic diagram of a system for providing purchase-data driven statements to an account holder, according to an example embodiment of the disclosure.

FIG. 1 depicts an example embodiment of a system for providing smart statements to an account holder, according to various embodiments of the disclosure. The system may include various network-enabled computer systems, including, as depicted in FIG. 1 for example, a financial institution 101; comprising an account processor 102, a statement processor 103, a database 104, and communication module 109 which may be included as separate processors or combined into a single processor or device having the multiple processors. The system may also include an advertiser 105.

In various embodiments, the statement processor 103, database 104, and/or the account processor 102 may be separate from financial institution 101. The statement processor 103, database 104, account processor 102, and/or communication module also may be integrated into advertiser 105 and/or merchant 107. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation and provisioning of an account holder's smart statement.

The components depicted in FIG. 1 may store information in various electronic storage media, such as, for example, database 104. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the example types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, an account holder 106 may be any individual or entity that desires to conduct a financial transaction using one or more accounts held at one or more financial institutions. Also, account holder 106 may be a computer system associated with or operated by such an individual or entity. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, an account or service that links to an underlying payment account already described, or mobile commerce account. A financial institution may be, for example, a bank, other type of financial institution, including a credit card provider, for example, or any other entity that offers accounts to customers. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

As used herein, the term mobile device may be, for example, a handheld PC, a phone, a smartphone, a PDA, a tablet computer, or other device. The mobile device may include Near Field Communication (NFC) capabilities, which may allow for communication with other devices by touching them together or bringing them into close proximity. Example NFC standards include ISO/IEC 18092:2004, which defines communication modes for Near Field Communication Interface and Protocol (NFCIP-1). For example, a mobile device may be configured using the Isis Mobile Wallet™ system, which is incorporated herein by reference. Other example NFC standards include those created by the NFC Forum.

As described in reference to FIG. 1, financial institution 101 may provide an account holder 106 with one or more financial accounts. The financial account may be associated with the account holder's one or more mobile devices. The mobile device may be configured to act as a method of payment at a POS location (merchant 107) using, for example, NFC or any other mobile payment technology. When account holder uses mobile device 106 at a POS location associated with, for example, merchant 107, to perform a financial transaction, the financial transaction may be charged to the mobile payment account. For example, the account holder may use the device 106 in lieu of a credit card to make a purchase at merchant 107. The purchase would then be charged to the mobile payment account and/or credit or debit payment account associated with the account holder device 106. The mobile payment account may be stored in a mobile payment account database at financial institution 101. The account may be a traditional credit card account where the account holder uses a credit card, rewards card, debit card, or similar method of payment to purchase goods and services from one or more merchants 107.

As described in reference to FIG. 1, account processor 102 may be configured to receive account data via network 108. The account data may be associated with one or more of an account holder's financial accounts. The accounts may be at financial institution 101. The accounts may be at a different financial institution, or multiple institutions. The account data may be received from the account holder 106. The account data may be received from financial institution 101, or another financial institution. The account data may be received from one or more merchants 107, and may include transaction data associated with a financial transaction between the account holder and merchant 107. The account data may be a combination of the aforementioned information received from multiple sources.

Account data may include, for example, an account balance; payments (e.g., monthly payments) made to or from the account; any transactions or purchases charged to the account; the physical address of the merchants associated with any transactions; the merchants' locations; information about the product or service that was purchased; any rewards points earned by account holder as a result of a transaction; any logos used by merchant 107; the date and time of any transactions; account holder interests and preferences (based on one or more surveys taken by the financial institution or a third party); demographic data associated with the account holder (e.g., age, gender, occupation, income, address, etc.) and/or any other account information that may appear on an account statement as described herein. The merchant location may be associated with, for example, a physical address and/or GPS coordinates. The account processor 102 may associate the account data with one or more of the account holder's financial accounts.

Account processor 102 also may be configured to receive advertising data via, for example communication module 109. Advertising data may be received for example, via network 108, from one or more advertisers 105. Advertising data also may be received from one or more merchants 107. Advertiser 105 and merchant 107 may be the same entity, or may be separate entities. Merchant 107 and/or advertiser 105 may be an entity that markets one or more products or services and wants to connect with or influence the purchasing decisions of an account holder or other consumer. Advertising data may include, for example, advertising promotions and messages; descriptive information associated with a product, service, brand, or merchant; price information; deals and coupons associated with a product, service, brand, or merchant; visual media, such as images and videos associated with an advertising promotion; location data associated with a merchant or vendor of the advertised products or services; social media promotions; demographic information associated with a certain demographic that the advertiser and/or merchant wants to reach; URL links to internet content; and/or any other information that an advertiser intends to communicate to consumers. Social media promotions may be promotions targeted to one or more users of a social networking website. Examples of social networking websites include, without limitation, Facebook, MySpace, Google+, LinkedIn, Twitter, Pintrest, Instagram, etc. The social media promotion may direct the consumer to a social media page for the advertiser or merchant. Account processor 102 and/or statement processor 103 may store advertising data in one or more databases 104 associated with, for example, financial institution 101. Account processor 102 and/or statement processor 103 also may store advertising data in one or more databases associated with, for example, a third party that may be couple with, for example a backend system of financial institution 101. The advertising data may be organized according to any number of categories, including, without limitation, merchant; product or service; price; merchant location; and demographic information.

Statement processor 103 may be configured to create a smart statement for the account holder, based at least in part on the account data and the advertising data. Statement processor 103 may compare an account holder's account data with advertising data to find one or more similarities and/or identify one or more relevant advertisements to appear on a smart statement. For example, statement processor 103 may compare product information from the account data (associated with recent purchases made by the account holder) with product information found in the advertising data for similarities. Statement processor 103 may compare the account holder's demographic information with the targeted demographic information from the advertising data for similarities. Statement processor 103 may compare location information from the account data with location information from the advertising data. These are just a few examples of points of comparison that may be utilized by the statement processor 103 to associate advertising data with account data in an account holder's smart statement. The smart statement may display to the account holder targeted advertisement data in conjunction with account data. The smart statement could be a paper statement that is mailed to an account holder in the same way that a traditional bank statement would be. The smart statement also may be a digital summary delivered electronically to the account holder. The smart statement could be presented on one or more websites operated by the financial institution, advertiser, merchant, or a third party host. The smart statement may be delivered to the account holder's mobile device as part of a mobile application.

For example, the account data may include information related to recent transactions performed by the account holder. The account holder may have recently purchased a appliance, such as a stove or cooktop. The account processor or statement processor may have received advertising data associated with a home goods business. Statement processor 103 may determine that the account holder is more likely to respond to an advertisement for new pots and pans on the fact that the account holder recently purchased a cooktop. The statement processor 103 may create a smart statement for the account holder that includes advertising information associated with the home goods business. The information may include a link to the home goods business' website. The smart statement also may include a business logo for the home goods business. The smart statement also may include coupons or promotions for products or services offered by the home goods business. The smart statement may include consumer ratings for the business, such as Yelp ratings. The smart statement may include interactive media content, such as a digital video link to, for example, particular products offered by the home goods business. The smart statement may include a link to the business's page on one or more social networking sites. The smart statement may include a personalized text-based message to the account holder that includes interactive content, such as a clickable link to an advertiser's website or an interactive survey that solicits one or more responses from the account holder. In this and other ways, the smart statement may facilitate interactive, two-way communication between an account holder and one or more advertisers and/or merchants.

In another example, the account data may indicate that the account holder recently ate at a Thai-restaurant. The account data may include the restaurant location. Statement processor 103 may create a smart statement that includes the account data alongside advertising data associated with one or more Thai restaurants in the account holder's geographical area. The statement may include a line-item showing the amount the account holder spent at the Thai restaurant, alongside advertising information associated with one or more other Thai restaurants that are within a certain distance of the restaurant where the account holder bought a meal. The advertising data in the smart statement may include coupons or specials offered by the advertised restaurants. The advertising information on the smart statement may include local and/or national reviews of the advertised restaurants. The statement may include links for directions to the advertised restaurants. The statement may include links allowing the account holder to reserve a table at an advertised restaurants using services such as OpenTable®. The smart statement may invite the account holder to post a review of the Thai restaurant on Yelp. In this and other ways, the smart statement may facilitate interactive, two-way communication between an account holder and one or more advertisers and/or merchants The smart statement also may include peer-group data, showing similar restaurants that are popular with consumers in the account holder's peer group. So for example, the statement may include information, such as a graph, message, diagram, or chart, informing the account holder that Restaurant X is the most Thai popular restaurant with 30-year old males having a college degree that is within 20 miles of the account holder. In this way, advertising data may be targeted more efficiently to specific account holders who are more likely to respond it.

Statement processor 103 may provide the smart statement to the account holder. The statement may be provided as a traditional paper statement. The statement may be electronically provided as a graphical user interface (GUI) or application programming interface (API), which the account holder may customize depending on the information they desire to view. The account holder may be able to view the statement on a computing device or a mobile device, such as a smartphone or tablet computer.

Statement processor 103 may be configured to track the account holder's spending after providing the smart statement to the account holder. Statement processor 103 may receive new account data, and compare the new account data with the advertising data in the most recent smart statement to determine if the account holder responded to any of the advertising data and made a purchase at one or more of the advertised businesses. For example, if the smart statement included advertisement data for a restaurant chain, the statement processor 103 may track the account holder's future account data to determine if the account holder began spending at the restaurant chain—or increased spending relative to previous months—after the smart statement was provided. In this way, the statement processor 103 may be able to quantitatively measure the relative effectiveness of different advertising data that was previously included in the smart statement.

Statement processor 103 may report account holder spending changes and trends to one or more advertisers and/or merchants. Statement processor 103 may be configured to make predictive recommendations to one or more advertisers and/or merchants, based on account holder spending in response to targeted advertisements in an account holder's smart statement. Statement processor 103 may be configured to report the effectiveness of a certain advertisement or ad campaign based on an account holder's age, gender, income level, education, occupation, location, and other demographic factors. Statement processor 103 may determine that account holder's within a certain demographic were most likely to positively respond to certain targeted smart statement advertisements from one or more advertisers or merchants.

For example, statement processor 103 may determine that female account holders between the ages of 20 and 35 were most likely to positively respond to a perfume advertisement on their smart statements, where the perfume advertisement included a link to the advertiser or merchant's social media page. In this way, statement processor 103 may provide predictive information to advertisers and merchants.

Communication module 109 may include various hardware and software components, such as, for example, a repeater, a microwave antenna, a cellular tower, or another network access device capable of providing connectivity between two different network mediums. Communication module 109 may be capable of sending or receiving signals via network. Moreover, communication module 109 may provide connectivity to one or more wired networks and may be capable of receiving signals on one medium such as a wired network and transmitting the received signals on a second medium such as a wireless network.

Communication module 109 also may be operable to receive incoming communications from one or more sources and transmit outgoing communications to one or more sources. For example, communication module may be operable to receive and/or transmit communication to and from a mobile device, or the communication module may be operable to receive communications from and/or transmit communications to a distributed system associated with, for example, a merchant (e.g., merchant 107) and/or advertiser (e.g., advertiser 105). For example, a mobile device may communicate with communication module 109 via a network. Additional devices may also be in communication with the communication module 109, either in parallel or in serial connection with the communication module, and additional devices with other communication protocols may be employed to communicate with the communication module.

Figure 2:
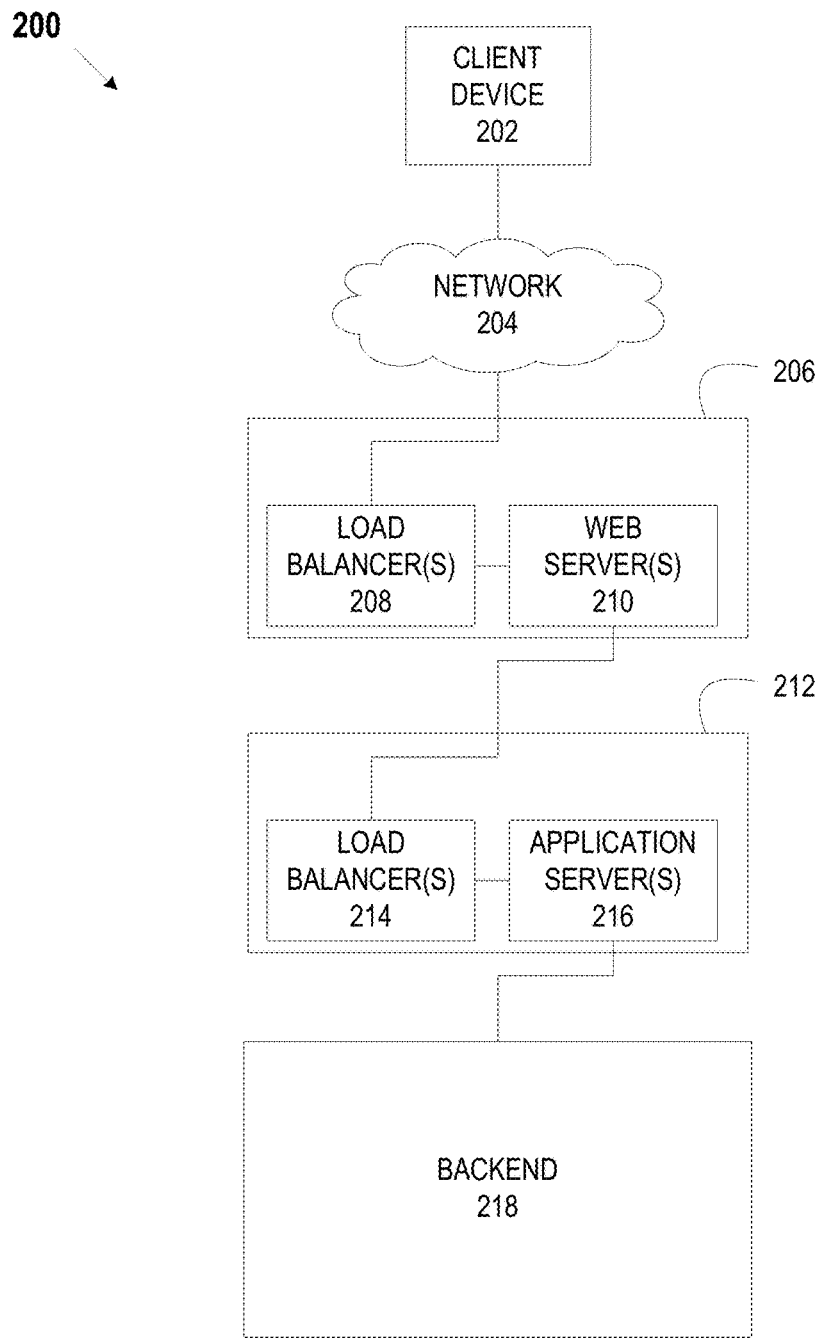
FIG. 2 depicts an example system for providing purchase-data driven statements to an account holder, according to an example embodiment of the disclosure.

FIG. 2 depicts an example system 200 that may enable a financial institution, for example, to provide network services to its customers. Example system 200 also illustrates examples of merchant systems (e.g., merchant 107) and advertiser systems (e.g., advertiser 105). Merchant and advertiser systems similar to system 200 may enable a financial institution, merchant, and advertiser, for example, to provide smart statements to users of client devices (e.g., client device 202). Client device 202 may be similar to the user device used by account holder 106 as described above. Also, network 204 may be similar to network 108 of FIG. 1.

As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 110 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 110 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 110 may further include one network, or any number of example types of networks mentioned above, operating as a stand-alone network or in cooperation with each other. Network 110 may utilize one or more protocols of one or more network elements to which they are communicatively couples. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, client device 202, connect to access various services of a financial institution, for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device A 02) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device AO2 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributes system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200.

In various examples, backend 218 may include similar components as financial institution 101. In these examples, backend 218 may enable a financial institution, along with the various databases, communication modules and processors associated therewith to provide smart statements. Backend 218 also may include various components (e.g., databases and processors as shown and described herein) to monitor account activity and determine the effectiveness of the purchase-driven data provided in the smart statements. Backend 218 also may include various backend components that may be associated with an advertiser (e.g., advertiser 105). Accordingly, backend 218 may include databases, processors, and communication modules for providing advertisements, including, for example, advertisement data and the like. Backend 218 also may include various backend components that may be associated with a merchant. For example, backend 218 may include systems similar to the retail enterprise system 324 as shown and described below in FIG. 3.

Figure 3:
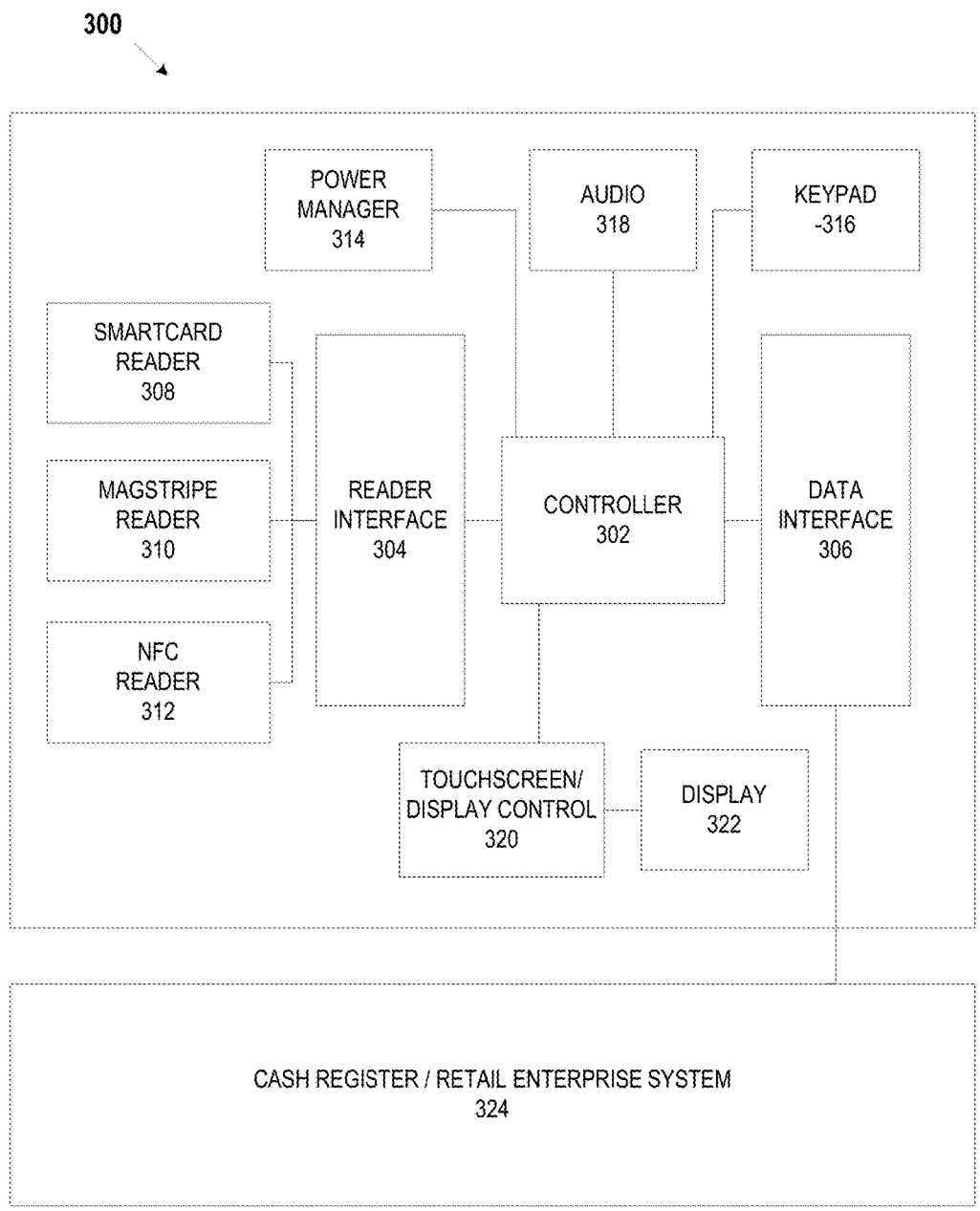
FIG. 3 depicts an example system point of sale system, according to an example embodiment of the disclosure.

FIG. 3 depicts an example Point of Sale (PoS) device 300. PoS device 300 may provide the interface at what a customer or end user makes a payment to the merchant in exchange for goods or services. PoS device 300 may include and/or cooperate with weighing scales, scanners, electronic and manual cash registers, electronic funds transfer at point of sale (EFTPOS) terminals, touch screens and any other wide variety of hardware and software available for use with PoS device 300. PoS device 300 may be a retail point of sale system and may include a cash register and/or cash register-like computer components to enable purchase transactions. PoS device 300 also may be a hospitality point of sale system and include computerized systems incorporating registers, computers and peripheral equipment, usually on a computer network to be used in restaurant, hair salons, hotels or the like. PoS device 300 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 300 also may be a cloud-based point of sale system that can be deployed as software as a service, which can be accessed directly from the Internet using, for example, an Internet browser.

Referring to FIG. 3, an example PoS device 300 is shown. PoS device 300 may include a controller 302, a reader interface 304, a data interface 306, a smartcard reader 308, a magnetic stripe reader 310, a near-field communications (NFC) reader 312, a power manager 314, a keypad 316, an audio interface 318, a touchscreen/display controller 320, and a display 322. Also, PoS device 300 may be coupled with, integrated into or otherwise connected with a cash register/retail enterprise system 324.

In various embodiments, Controller 302 may be any controller or processor capable of controlling the operations of PoS device 300. For example, controller 302 may be a Intel® 2nd Generation Core™ i3 or i5 or Pentium™ G850 processor or the like. Controller 302 also may be a controller included in a personal computer, smartphone device, tablet PC or the like.

Reader interface 304 may provide an interface between the various reader devices associated with PoS device 300 and PoS device 300. For example, reader interface 304 may provide an interface between smartcard reader 308, magnetic stripe reader 310, NFC reader 312 and controller 302. In various embodiments, reader interface 304 may be a wired interface such as a USB, RS232 or RS485 interface and the like. Reader interface 304 also may be a wireless interface and implement technologies such as Bluetooth, the 802.11(x) wireless specifications and the like. Reader interface 304 may enable communication of information read by the various reader devices from the various reader devices to PoS device 300 to enable transactions. For example, reader interface 304 may enable communication of a credit or debit card number read by a reader device from that device to PoS device 300. In various embodiments, reader interface 304 may interface between PoS device 300 and other devices that do not necessarily "read" information but instead receive information from other devices.

Data interface 306 may allow PoS device 300 to pass communicate data throughout PoS device and with other devices including, for example, cash register/retail enterprise system 324. Data interface 306 may enable PoS device 300 to integrate with various customer resource management (CRM) and/or enterprise resource management (ERP) systems. Data interface 306 may include hardware, firmware and software that make aspects of data interface 306 a wired interface. Data interface 306 also may include hardware, firmware and software that make aspects of data interface 306 a wireless interface. In various embodiments, data interface 306 also enables communication between PoS device other devices.

Smartcard reader 308 may be any electronic data input device that reads data from a smart card. Smartcard reader 308 may be capable of supplying an integrated circuit on the smart card with electricity and communicating with the smart card via protocols, thereby enabling read and write functions. In various embodiments, smartcard reader 308 may enable reading from contact or contactless smart cards. Smartcard reader 308 also may communicate using standard protocols including ISO/IEC 7816, ISO/IEC 14443 and/or the like or proprietary protocols.

Magnetic stripe reader 310 may be any electronic data input device that reads data from a magnetic stripe on a credit or debit card, for example. In various embodiments, magnetic stripe reader 310 may include a magnetic reading head capable of reading information from a magnetic stripe. Magnetic stripe reader 310 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments. Track 3 transmission channels also may be used to transmit, for example, geolocation data associated with a user, product data relating to the purchase (e.g., product information, stock keeping unit (SKU) level data, and/or any other information that may be used to provide purchase-driven smart statements. PoS device 300 may communicate and or cooperate with the user device to provide the information into track 3 transmission channels. Other methods for providing product level data to a financial institution. For example, a merchant can transmit the product data for each transaction to a financial institution along with information that identifies the transaction.

NFC reader 312 may be any electronic data input device that reads data from a NFC device. In an exemplary embodiment, NFC reader 312 may enable Industry Standard NFC Payment Transmission. For example, the NFC reader 312 may communicate with a NFC enabled device to enable two loop antennas to form an air-core transformer when placed near one another by using magnetic induction. NFC reader 312 may operate at 13.56 MHz or any other acceptable frequency. Also, NFC reader 312 may enable a passive communication mode, where an initiator device provides a carrier field, permitting answers by the target device via modulation of existing fields. Additionally, NFC reader 312 also may enable an active communication mode by allowing alternate field generation by the initiator and target devices.

In various embodiments, NFC reader 312 may deactivate an RF field while awaiting data. NFC reader 312 may receive communications containing Miller-type coding with varying modulations, including 100% modulation. NFC reader 312 also may receive communications containing Manchester coding with varying modulations, including a modulation ratio of approximately 10%, for example. Additionally, NFC reader 312 may be capable of receiving and transmitting data at the same time, as well as checking for potential collisions when the transmitted signal and received signal frequencies differ.

NFC reader 312 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 312 may be able to utilize transmission protocols and methods that are developed in the future using other frequencies or modes of transmission. NFC reader 312 also may be backwards-compatible with existing payment techniques, such as, for example RFID. Also, NFC reader 312 may support transmission requirements to meet new and evolving payment standards including internet based transmission triggered by NFC. In various embodiments, NFC reader 312 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 314 may be any microcontroller or integrated circuit that governs power functions of PoS device 300. Power manager 314 may include, for example, firmware, software, memory, a CPU, a CPU, input/output functions, timers to measure intervals of time, as well as analog to digital converters to measure the voltages of the main battery or power source of PoS device 300. In various embodiments, Power manager 314 remain active even when PoS device 300 is completely shut down, unused, and/or powered by the backup battery. Power manager 314 may be responsible for coordinating many functions, including, for example, monitoring power connections and battery charges, charging batteries when necessary, controlling power to other integrated circuits within PoS device 300 and/or other peripherals and/or readers, shutting down unnecessary system components when they are left idle, controlling sleep and power functions (on and off), managing the interface for built-in keypad and trackpads, and/or regulating a real-time clock (RTC).

Keypad 316 may any input device that includes a set of buttons arranged, for example, in a block or pad and may bear digits, symbols and/or alphabetical letters. Keypad 316 may be a hardware-based or mechanical-type keypad and/or implemented in software and displayed on, for example, a screen or touch screen to form a keypad. Keypad 316 may receive input from a user that pushed or otherwise activates one or more buttons on keypad 316 to provide input.

Audio interface 318 may be any device capable of providing audio signals from PoS device 300. For example, audio interface may be a speaker or speakers that may produce audio signals. In various embodiments, audio interface 318 may be integrated within PoS device 300. Audio interface 318 also may include components that are external to PoS device 300.

Touchscreen/display control 320 may be any device or controller that controls an electronic visual display. Touchscreen/display control 320 may allow a user to interact with PoS device 300 through simple or multi-touch gestures by touching a screen or display (e.g., display 322). Touchscreen/display control 320 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 320 may receive inputs from the touchscreen and process the received inputs. Touchscreen/display control 320 also may control the display on PoS device 300, thereby providing the graphical user interface on a display to a user of PoS device 300.

Display 322 may be any display suitable for a PoS device. For example, display 322 may be a TFT, LCD, LED or other display. Display 322 also may be a touchscreen display that for example allows a user to interact with PoS device 300 through simple or multi-touch gestures by touching a screen or display (e.g., display 322). Display 322 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 322 may receive inputs from control gestures provided by a user. Display 322 also may display images, thereby providing the graphical user interface to a user of PoS device 300.

Cash register/retail enterprise system 324 may me any device or devices that cooperate with PoS device 300 to process transactions. Cash register/retail enterprise system 324 may be coupled with other components of PoS device 300 via, for example, a data interface (e.g., data interface 306) as illustrated in FIG. 3. Cash register/retail enterprise system 324 also may be integrated into PoS device 300.

In various embodiments, cash register/retail enterprise system 324 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 324 may comprise an retail enterprise system and/or a customer relationship management system. Retail enterprise system 324 may enable retain enterprises to manage operations and performance across a retail operation. Retail enterprise system 324 may be a stand-alone application in, for example, individual stores, or may be interconnected via a network. Retail enterprise system 324 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 324 also may include inventory control and tracking capabilities, reporting tools, customer management capabilities, employee management tools, and may integrate with other accounting software.

In various embodiments cash register/retail enterprise system 324 may be a hospitality PoS. In such embodiments, retail enterprise system 324 may include hospitality PoS software (e.g, Aloha PoS Restaurant software from NCR®, Micros® RES and Symphony software and the like), hospitality management software, and other hardware and software to facilitate hospitality operations.

Figure 4:
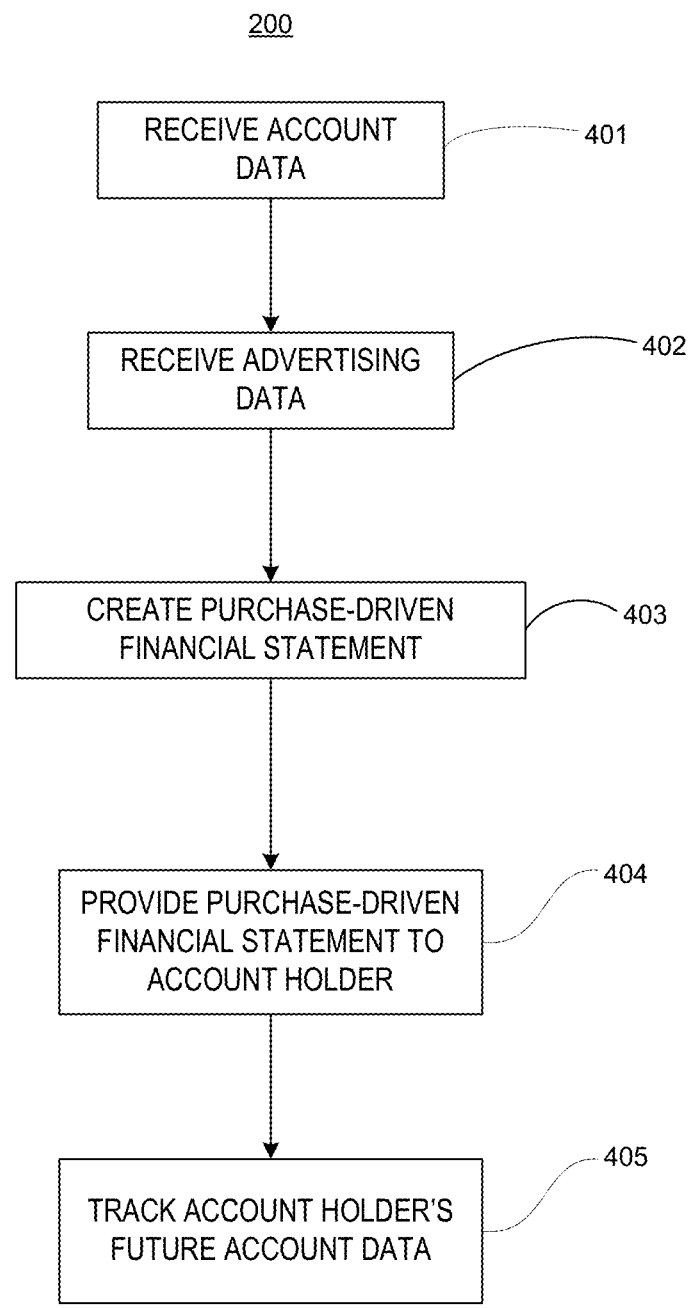
FIG. 4 depicts a flow diagram of a method for providing purchase-data driven statements to an account holder, according to an example embodiment of the disclosure.

FIG. 4 is a flow chart illustrating a method for providing a smart statement to an account holder. Method 400 shown in FIG. 4 can be executed or otherwise performed by one or more combinations of various systems shown and described above. Method 400 as described below may be carried out by the system for providing a smart statement to an account holder as shown in FIGS. 1-3, by way of example, and various elements of that system are referenced in explaining the method of FIG. 4. Each block shown in FIG. 4 represents one or more processes, methods, or subroutines in the example method 400. Referring to FIG. 4, the example method 400 may begin at block 401.

In block 401, method 400 may include receiving account data. The account data may be associated with one or more of an account holder's financial accounts. The accounts may be at, for example, financial institution 101. The accounts may be at a different financial institution, or multiple institutions. The account data may be received from the account holder 106 and/or a user device associated with account holder 106 (e.g., client device 202) via a network (e.g., network 108 and/or network 204). The account data may be received from financial institution 101, or another financial institution. The account data may be received from one or more merchants (e.g., merchant 107 and or a merchant associated with PoS 300), via a network (e.g., network 108 and/or network 204), and may include transaction data associated with a financial transaction performed by the account holder at the merchant. The account data may be a combination of the aforementioned information received from multiple sources.

Account data may include, for example, an account balance; monthly payments made to or from the account; any transactions charged to the account; the physical address of the merchants associated with any transactions; the merchants' locations; information about the product or service that was purchased; any rewards points earned by account holder as a result of a transaction; any logos used by merchant 107; the date and time of any transactions; and demographic data associated with the account holder (e.g., age, gender, occupation, income, address, etc.). The merchant location may be associated with, for example, GPS coordinates. The account processor 102 may associate the account data with one or more of the account holder's financial accounts. Method 400 may continue at block 402.

In block 402, method 400 may include receiving advertising data. Advertising data may be received from one or more advertisers (e.g., advertisers 105). Advertising data may be received from one or more merchants (e.g., merchants 107). Advertising data may include advertising promotions; descriptive information associated with an advertised products, services, and brands; price information; deals and coupons; visual media, such as images and videos associated with an advertising promotion; location data associated with a merchant or vendor of the advertised products or services; social media promotions; demographic information associated with a targeted demographic; and URL links to internet content. Social media promotions may be promotions targeted to one or more users of a social networking website. Examples of social networking sites include, without limitation, Facebook, MySpace, Google+, LinkedIn, Twitter, Pintrest, etc. Account processor 102 and/or Statement processor 103 may store advertising data in one or more databases 104. The advertising data may be organized according to any number of categories, including, without limitation, merchant; product or service; price; merchant location; and demographic information. Method 400 may continue at block 403.

In block 403, method 400 may include creating a smart statement based at least in part on the account data and the advertising data. Statement processor 103 may compare an account holder's account data with advertising data to find one or more similarities. Statement processor 103 may compare product information from the account data (associated with recent purchases made by the account holder) with product information found in the advertising data for similarities. Statement processor 103 may compare demographic information from the account data with the targeted demographic information from the advertising data for similarities. Statement processor 103 may compare location information from the account data with location information from the advertising data. These are just a few example points of comparison that may be utilized by the statement processor 103 to associate appropriate advertising data with account data in a smart statement. The created smart statement may display targeted advertisement data in conjunction with account data. Method 200 may continue at block 204.

In block 404, method 400 may include providing the smart statement to the account holder. The statement may be provided as a traditional paper statement. The statement may be provided electronically as a graphical user interface (GUI) or application programming interface (API). The account holder may be able to edit or customize the display of the smart statement. The account holder may be able to view the statement on a computing device or a mobile device, such as a smartphone or tablet computer. Method 400 may continue to block 405.

In block 405, method 400 may include tracking the account holder's future spending after the smart statement is provided. Statement processor 103 may receive new account data, and compare the new account data with the advertising data in the most recent smart statement to determine if the account holder responded to any of the advertising data and made a purchase at one or more of the advertised businesses. For example, if the smart statement included advertisement data for a restaurant chain, the statement processor 103 may track the account holder's future account data to determine if the account holder began spending at the restaurant chain—or increased spending relative to previous months—after the smart statement was provided. In this way, the statement processor 103 may be able to quantitatively measure the relative effectiveness of different advertising data that was previously included in the smart statement.

Figure 5:
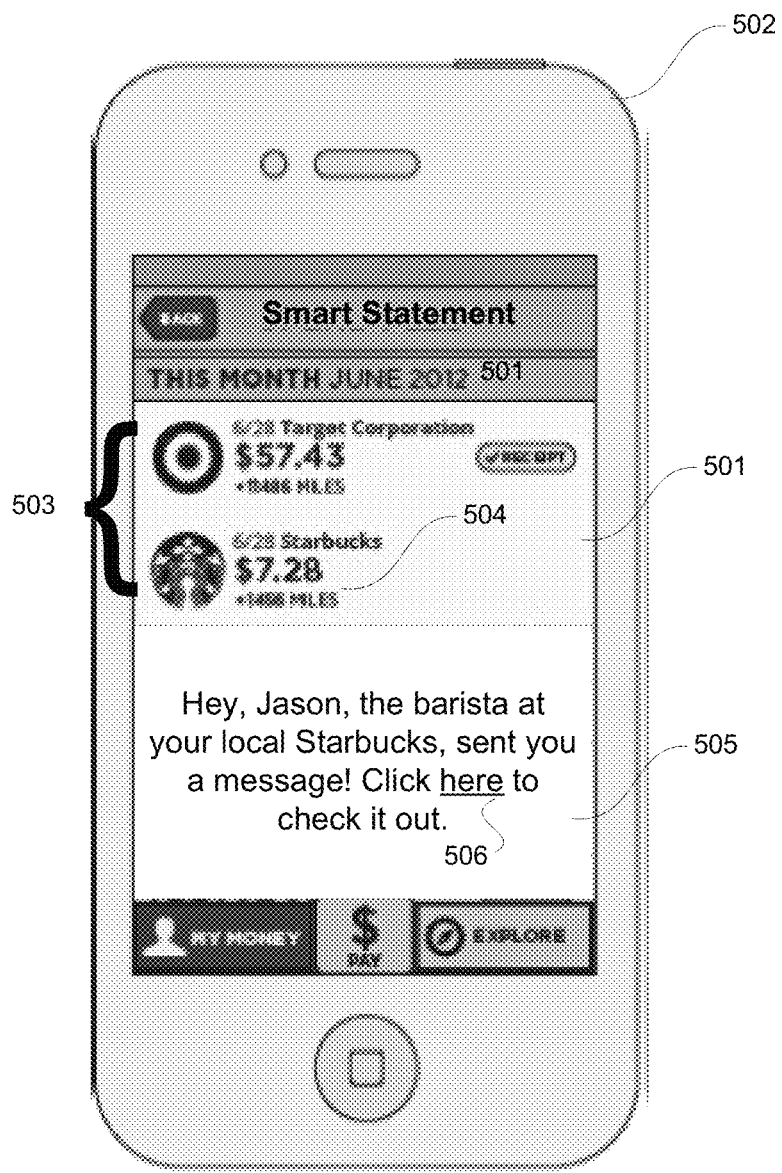
FIG. 5 depicts a screenshot of a purchase-data driven statement displayed on a mobile device, according to an example embodiment of the disclosure.

FIG. 5 is an example screenshot of a smart statement 501 presented to an account holder on his or her mobile device 502. The statement 501 in FIG. 5 may lists a portion of the account holder's purchase data 503 for the month of June. The statement includes an entry 504 for a purchase made at Starbucks on June 28. Statement processor 103 may associate this purchase data with advertising data that promotes Starbucks products and services. As shown in FIG. 5, the smart statement 501 may include a targeted advertisement 505 presented to the account holder based on the purchase data. In this embodiment, the advertisement 505 is presented as a personalized text-based message to the account holder that invites a response from the account holder. In this embodiment, the targeted advertisement 505 is interactive and invites the account holder to click on a link 506 to receive further information. The link 506 may be embedded in the targeted advertisement and may direct the account holder to a website for the product or service. In this embodiment, if the account holder clicks on the link 506, he may be directed to a promotional website for Starbucks coffee. The advertisement 505 may additionally or alternatively be for another local coffee shop or chain.

Figure 6:
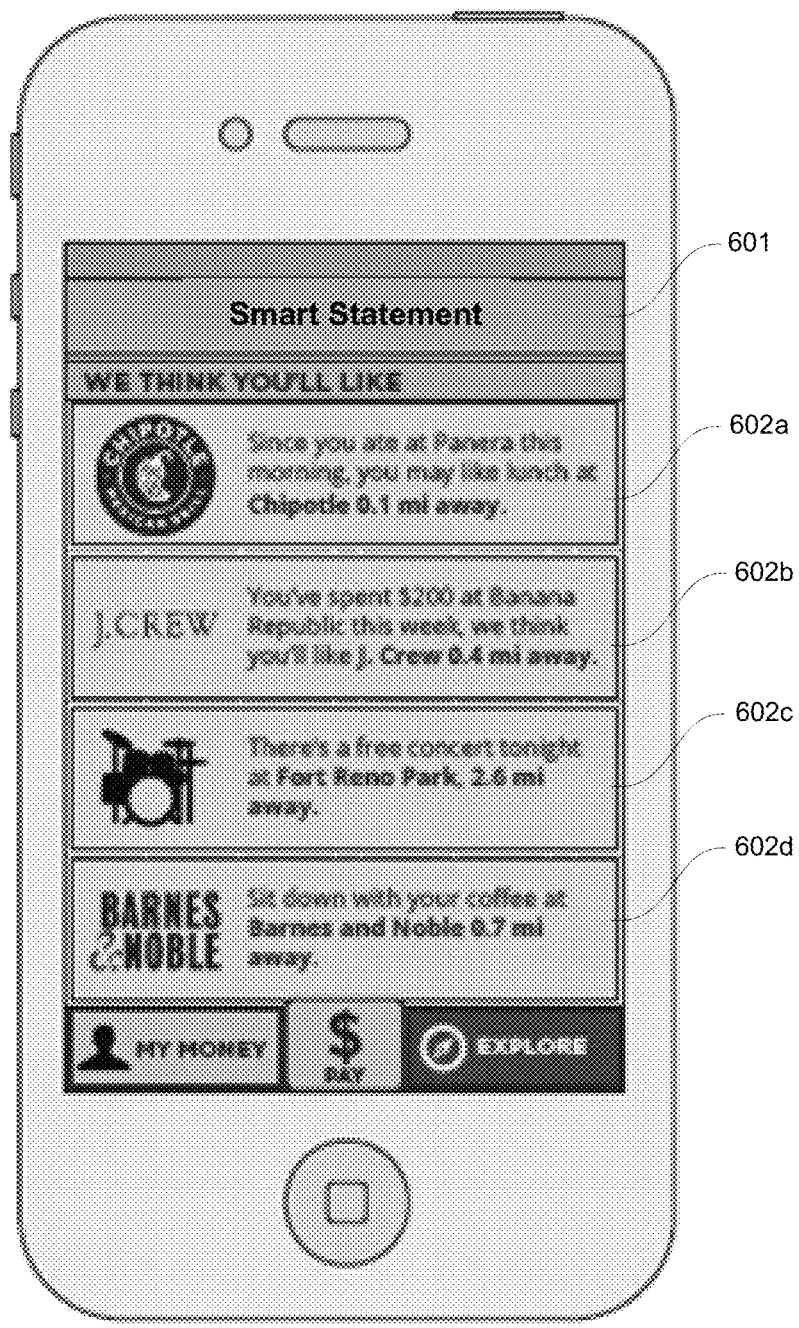
FIG. 6 depicts a screenshot of a purchase-data driven statement displayed on a mobile device, according to an example embodiment of the disclosure.

FIG. 6 is an example screenshot of a smart statement 601 presented to an account holder on his or her mobile device. The smart statement 601 in FIG. 6 may be a different view of the statement shown in FIG. 5. In FIG. 6, targeted advertisements 602a-d may be presented as a list. Each advertisement 602a-d may include location information showing the account holder where the closest merchant is located. For example, the account holder may have recently purchased lunch at Panera. Statement processor may have received advertising data from Chipotle that includes location information for Chipotle restaurants. Statement processor 103 may present a Chipotle advertisement 602a to the account holder, along with the location of the nearest Chipotle restaurant, based on the account holder's recent purchase at Panera. Similarly, statement processor 103 may present a J. Crew targeted advertisement 602b based on the account holder's recent $200 purchase at Banana Republic.

Figure 7:
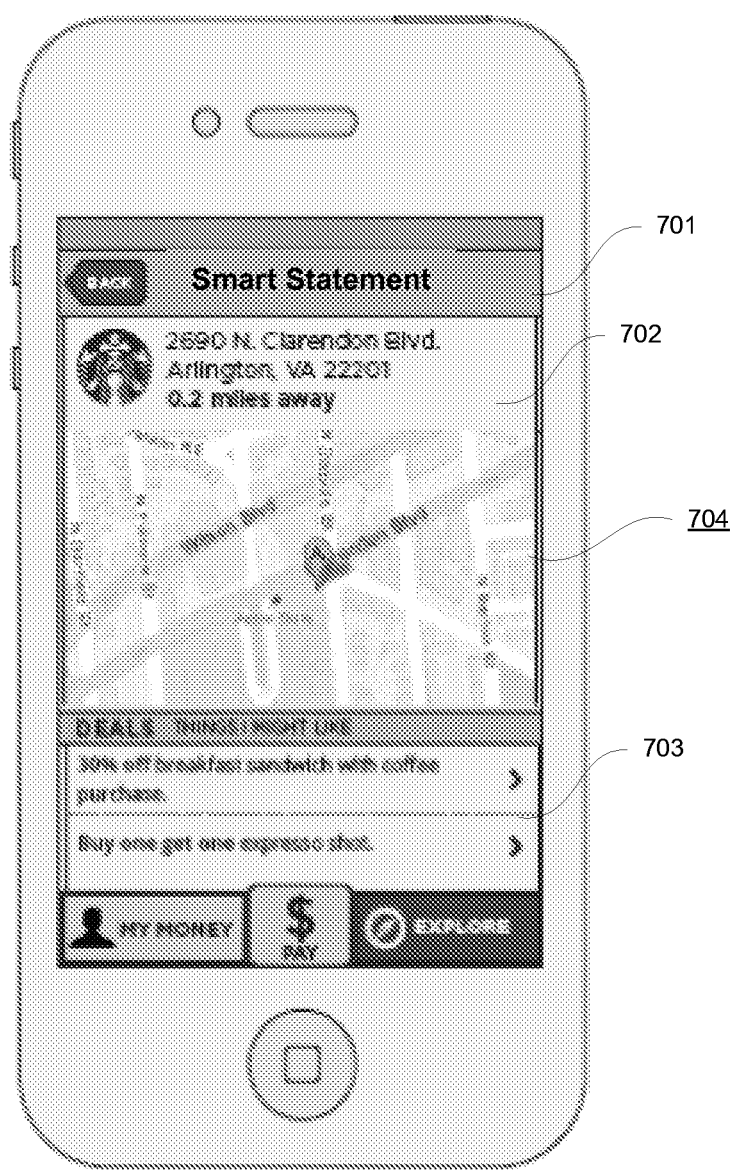
FIG. 7 depicts a screenshot of a purchase-data driven statement displayed on a mobile device, according to an example embodiment of the disclosure.

FIG. 7 is an example screenshot of a smart statement 701 on an account holder's mobile device. The smart statement 701 in FIG. 7 may be one of multiple views that are presented to an account holder. Other, non-limiting views may include those depicted in, for example, FIGS. 5 and 6. In FIG. 7, the smart statement 701 may include a targeted Starbucks advertisement 702 that includes location information for the Starbucks that is located nearest the account holder. The smart statement may 701 also include promotional deals, discounts, and advertisements 703 that the account holder may take advantage of for future purchases. The smart statement 701 may include map 704 showing the location for the Starbucks that is located nearest the account holder. Statement processor 103 may include this advertisement data in the account holder's smart statement based on the account holder's past purchases at Starbucks (or other coffee shops), based on the account holder's location, demographic information, interests, or some combination of this and other relevant information.

FIGS. 5-7 are just several non-limiting examples of the numerous ways that an account holder's smart statement may be presented and organized.

It is further noted that the software described herein maybe tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A system for providing an account holder with a purchase-data driven statement, comprising:
   one or more processors configured to:
   receive, via a network:
      account data comprising one or more past purchases of the account holder,
      advertising data associated with a first merchant and comprising information associated with advertised products and services including location information for the advertised products and services, and
      location data of an account holder device;
   compare the advertising data to the account data to identify a first product or service included in both the advertising data and the account data;

determine that the location information for the first product or service matches the location data of the account holder device;
create, in real-time, a targeted advertisement for the first product or service that includes a personalized text-based message, the message including a link that is selectable by a user of the account holder device to direct the account holder device to a website associated with the first product or service;
generate, in real-time, a graphical user interface comprising the account data, the advertising data, and the targeted advertisement;
transmit, to the account holder device, the graphical user interface, wherein the graphical user interface facilitates two-way communication between the account holder device and the first merchant and causes a single display of the account holder device to present and organize the targeted advertisement, the account data, and the advertising data;
receive new account data comprising one or more new purchases of the account holder made after transmitting the targeted advertisement;
compare the account holder's spending associated with the new account data to the account holder's spending associated with the account data;
determine a quantitative measure of a relative effectiveness of the targeted advertisement based on whether the account holder's spending increased or decreased after transmitting the targeted advertisement;
obtain demographic information associated with the account holder;
generate predictive recommendations by associating the quantitative measure of the relative effectiveness of the targeted advertisement with the demographic information; and
transmit the predictive recommendations to the first merchant.

2. The system of claim 1, wherein
the advertising data and the account data each further comprises at least two from among:
one or more images of the advertised products and services,
one or more social media promotions,
demographic information of a target audience, or
web links to advertiser content; and
the one or more processors create the graphical user interface based on the advertising data.

3. The system of claim 2, wherein the advertising data is stored in a third-party database associated with a financial institution.

4. The system of claim 1, wherein the
graphical user interface displays location information of the first merchant.

5. The system of claim 1, wherein the graphical user interface comprises a credit card statement.

6. The system of claim 1, wherein graphical user interface comprises a debit card statement.

7. The system of claim 1, wherein the graphical user interface further comprises a recommendation based on peer group data.

8. The system of claim 1, wherein the graphical user interface further comprises a link to an interactive survey.

9. A method for providing an account holder with a purchase-data driven statement, comprising:
receiving, via a network at one or more processors:
account data comprising one or more past purchases of the account holder,
advertising data associated with a first merchant and comprising information associated with advertised products and services including location information for the advertised products and services, and
location data of an account holder device;
comparing the advertising data to the account data to identify a first product or service included in both the advertising data and the account data;
determining that the location information for the first product or service matches the location data of the account holder device;
creating, in real-time, by the one or more processors, a targeted advertisement for the first product or service that includes a personalized text-based message, the message including a link that is selectable by a user of the account holder device to direct the account holder device to a website associated with the first product or service;
generating, in real-time, a graphical user interface comprising the account data, the advertising data, and the targeted advertisement, wherein the graphical user interface displays location information of the first merchant;
transmitting by the one or more processors, the graphical user interface, wherein the graphical user interface facilitates two-way communication between the account holder device and the first merchant and causes a single display of the account holder device to present and organize the targeted advertisement, the account data, and the advertising data;
receiving new account data comprising one or more new purchases of the account holder made after transmitting the targeted advertisement;
comparing the account holder's spending associated with the new account data to the account holder's spending associated with the account data;
determining, by the one or more processors, a quantitative measure of a relative effectiveness of the targeted advertisement based on whether the account holder's spending increased or decreased after transmitting the targeted advertisement;
obtaining, by the one or more processors, demographic information associated with the account holder;
generating, by the one or more processors, predictive recommendations by associating the quantitative measure of the relative effectiveness of the targeted advertisement with the demographic information; and
transmitting, by the one or more processors, the predictive recommendations to the first merchant.

10. The method of claim 9 wherein the advertising data compared to the account data further comprises at least two from among:
one or more images of the advertised products and services,
one or more social media promotions,
demographic information of a target audience, and
web links to advertiser content; and
creating, by the one or more processors, the graphical user interface based on the advertising data.

11. The method of claim 10, further comprising:
storing the advertising data in a third-party database associated with a financial institution.

12. The method of claim 9, further comprising:
generating a coupon for transmission to the user; and
determining, by the one or more processors, whether the coupon was redeemed.

13. The method of claim 9, wherein the graphical user interface comprises a credit card statement.

14. The method of claim 9, wherein the graphical user interface comprises a debit card statement.

15. The method of claim 9, wherein the graphical user interface further comprises a recommendation based on peer group data.

16. The method of claim 9, wherein the graphical user interface further comprises a link to an interactive survey.

* * * * *